United States Patent Office 3,113,641
Patented Dec. 10, 1963

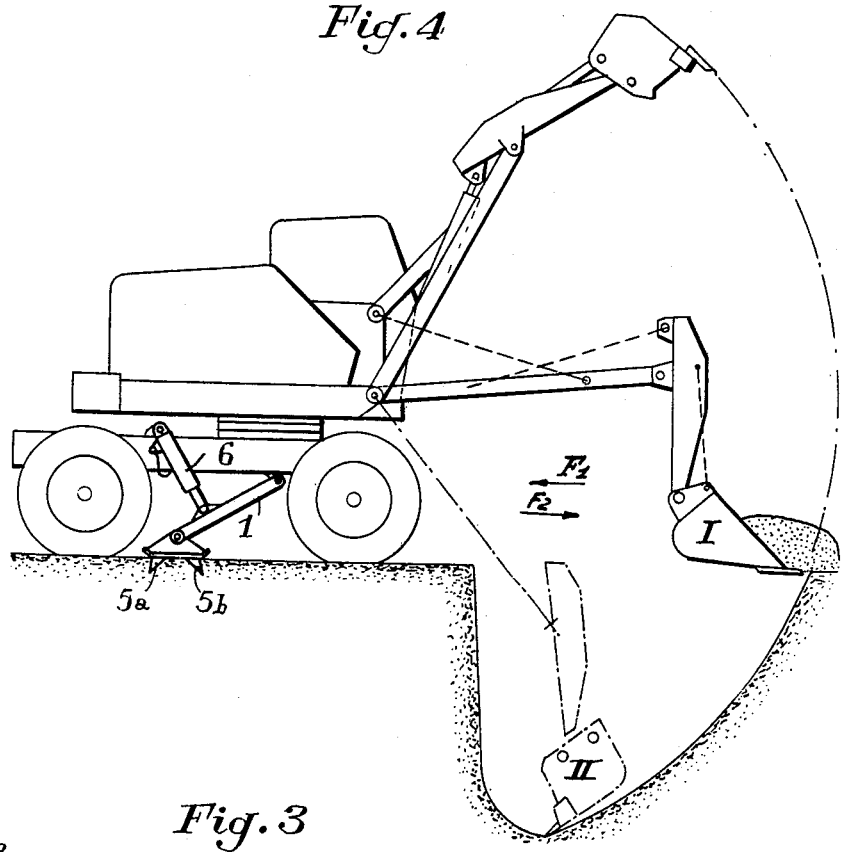
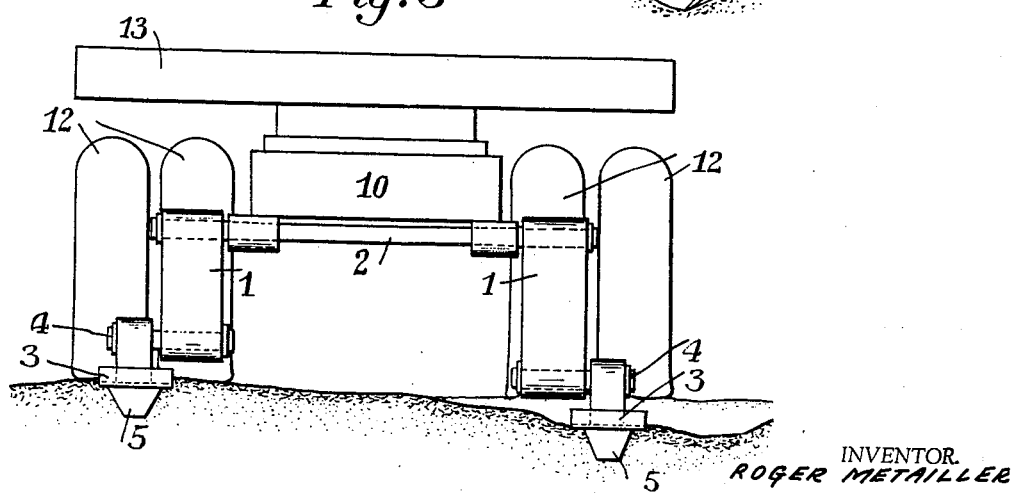

3,113,641
ARRANGEMENT OF LATERAL SPADES FOR AN EARTHMOVING APPLIANCE MOUNTED ON PNEUMATIC TIRES
Roger Metailler, Paris, France, assignor to Societe Auxiliaire de l'Entreprise (Auxen), Paris, France
Filed Nov. 16, 1960, Ser. No. 69,673
Claims priority, application France Nov. 20, 1959
1 Claim. (Cl. 188—7)

In earthmoving appliances mounted on pneumatic tires, in particular the action of the shovel or the forces exerted by the bucket are generally limited by adhesion of the tires to the ground. As soon as the force exerted at the bucket gives rise to a horizontal component coming close to the adhesion limit, the appliance merely slips over the ground despite blocking of the wheels by the brakes.

In order to obtain maximum efficiency it is usual practice to equip the chassis with anchoring spades which are arranged at one or the other extremity of the vehicle depending on whether the appliance is working in reverse or as a load-ridger. Such an arrangement requires special assembling operations before each work is performed. Furthermore it makes no contribution to transverse stability, the latter being provided by the tires alone to a more or less satisfactory degree.

The object of the present invention is a layout for earthmoving appliances mounted on pneumatic tires which allows the driver, by a simple operation carried out on the worksite itself, to anchor his vehicle in both forward and reverse while at the same time relieving the tires of the major part of the force required to insure lateral stability.

The layout in question is basically characterized by the use of two lateral spades.

An embodiment of the invention will be described, by way of example only and not in a limiting sense, with reference to the accompanying drawings.

FIGURES 1, 2 and 3 are a lateral view, a plan view and a cross-sectional view along the line III—III of FIGURE 2, respectively, with parts in cutaway and other parts in section, of the chassis of the appliance equipped with lateral spades.

FIGURE 4 is a lateral view showing the manner of operation of the chassis in FIGURES 1 through 3 when it is equipped with a bucket-shovel.

Figure 1:
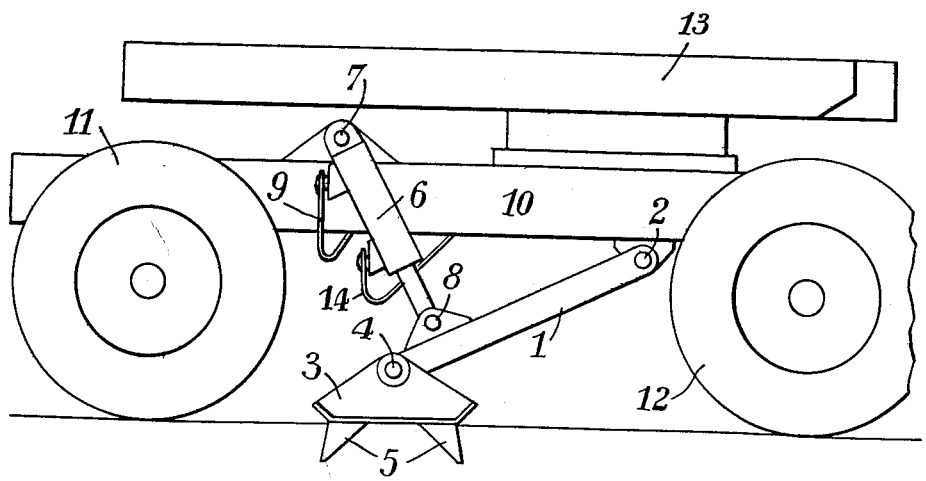

In the form shown in the drawings, the earthmoving appliance to be equipped in accordance with the invention comprises a chassis 10 which rests on the ground through the medium of a pair of single-tired wheels 11 in front and of a pair of double-tired wheels 12 at the rear. On the chassis 10 is mounted, in the manner well-known per se, a rotating platform 13 designed to carry the earthmoving equipment and tools, as well as the driver.

Each spade in accordance with the invention consists of an arm 1 articulated at 2 on the chassis 10 and carrying on its other end a shoe 3 articulated at 4. The shoe 3 and the spikes 5 with which it is equipped together form a spade which digs into the ground and prevents displacement of the chassis under the effect of stresses set up by operation of the earthmoving equipment mounted on the platform 13.

An adjustable positioning device, say a double-acting hydraulic jack 6 which is linked to the chassis through the articulation 7 and to the arm 1 through the articulation 8, enables the spade to be lowered into the operative position or to be raised when the earthmoving appliance is on the move.

The two chambers of each one of these two double-acting cylinders 6 are connected through lines 9 and 14 respectively to a compressed fluid distributing unit carried by the rotary platform 13.

Any other pneumatic or mechanical regulating devices can be used, alternatively, without departing from the scope of the invention.

Figure 2:
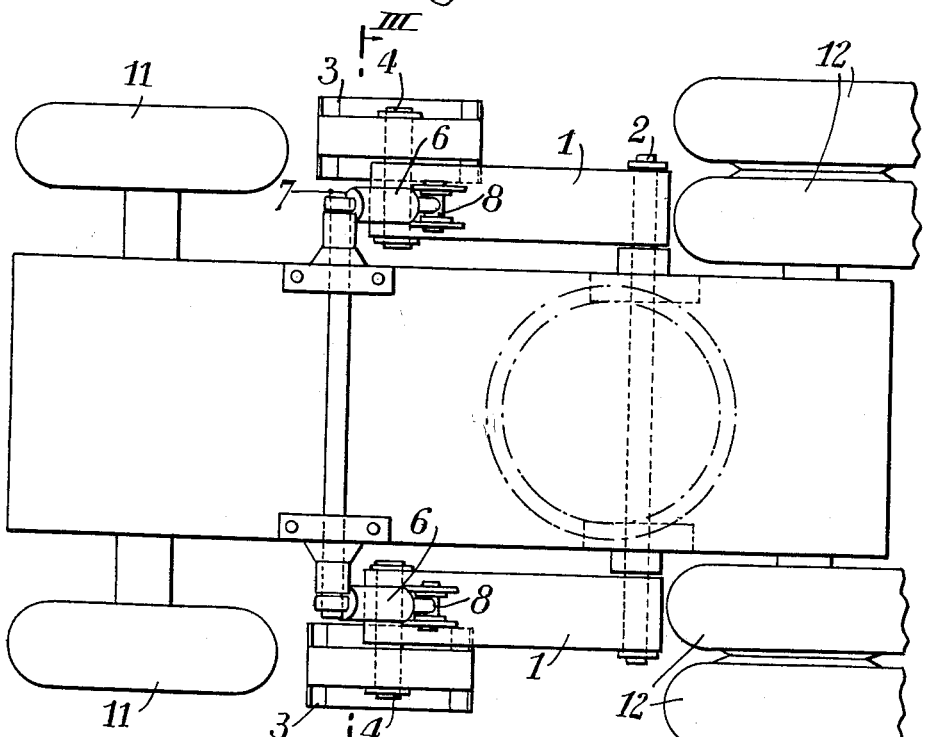

This arrangement of lateral spades works in the following manner:

FIGURE 4 shows the chassis illustrated in FIGURES 1 through 3 equipped with a shovel which can be fitted either with a loading-ridging bucket I or with a reverse-acting bucket II.

Operation with bucket I causes a reaction force along the arrow $F_1$ to be exerted on the chassis, this force being opposed by the dug-in spike 5a.

In reverse operation, the bucket II causes a reaction force along the arrow $F_2$ to be exerted on the chassis, the force being opposed in this case by the dug-in spike 5b.

For operations in a transverse direction to the chassis, the spaced located on the side of the bucket restricts the settling action of the tires and thus insures better transverse stability for the shovel.

What I claim is:

In a device of the class described, the combination of a wheeled vehicle having a frame with an arm articulated thereto and pivotal in a plane parallel to the motion direction of said vehicle, a ground engaging shoe articulated at an end of said arm, and means for forcing said arm toward the ground below said vehicle to effect gripping engagement of said shoe with the ground, said shoe having a pair of spikes extending generally downward therefrom, said spikes being of prismatic shape and being disposed equidistant from the pivotal axis between said arm and said shoe, each of said spikes having a pair of flat surfaces converging to a relatively sharp edge for being forced into the ground, said surfaces all diverging away from a plane which is normal to the ground through the pivotal axis between said arm and said shoe and transverse of the motion direction of said vehicle, corresponding surfaces of said spikes being disposed at the same angle with respect to said axis, said shoe having a flat undersurface engageable with the ground when said spikes are driven thereinto.

References Cited in the file of this patent

UNITED STATES PATENTS

| | | |
|---|---|---|
| 1,562,795 | Sauveur | Nov. 24, 1925 |
| 1,924,276 | Gerstenberger | Aug. 29, 1933 |
| 1,974,773 | Garigliano et al. | Sept. 25, 1934 |
| 2,247,782 | Martinson et al. | July 1, 1941 |
| 2,379,991 | Riboud | July 10, 1945 |
| 2,436,799 | Frost | Mar. 2, 1948 |
| 2,507,774 | Foley | May 16, 1950 |
| 2,695,682 | Ehlinger | Nov. 30, 1954 |
| 2,781,927 | Holopainen | Feb. 19, 1957 |

FOREIGN PATENTS

| | | |
|---|---|---|
| 479,064 | Canada | Dec. 4, 1951 |